United States Patent Office 3,549,485
Patented Dec. 22, 1970

3,549,485
FLOCCULATION-DEFLOCCULATION STEPS IN
MINERAL WOOL-CLAY BOARD FORMATION
Lewis W. Eckert, Lancaster, Pa., assignor to Armstrong
Cork Company, Lancaster, Pa., a corporation of Pennsylvania
No Drawing. Filed Mar. 4, 1968, Ser. No. 709,886
Int. Cl. D21d *3/00;* D21h *3/68, 5/18*
U.S. Cl. 162—152                                    4 Claims

ABSTRACT OF THE DISCLOSURE

In forming a board from a water slurry of clay and mineral wool, the slurry is flocculated prior to being introduced onto the forming machine and is subsequently deflocculated on the forming machine by showering the surface of the sheet, just after it forms on the wire, with a solution of sodium carbonate, sodium bicarbonate or sodium hydroxide.

BACKGROUND OF THE INVENTION

Field of the invention

This invention relates to boards formed from clay-mineral wool slurries and more particularly relates to boards formed by Fourdriniers from slurries of mineral wool and a clay having the clay characteristics of Mississippi M & D clay.

Descrption of the prior art

Ollinger, U.S. application Ser. No. 466,477, filed June 23, 1965, now U.S. Pat. No. 3,371,134 relates to the manufacture of ceramic sound absorbing board products useful for ceiling tile and ceiling panels. Denlinger, U.S. application Ser. No. 149,035, filed in 1961, now U.S. Pat. No. 3,136,683 discloses that if sodium bicarbonate is added to the slurry of mineral wool and clay prior to board formation, boards of increased strength are realized.

SUMMARY OF THE INVENTION

In accordance with this invention, it has now been discovered that if the slurry which is added to the head-box of a Fourdrinier is flocculated and if the board formed on the board forming machine is subsequently deflocculated by showering the surface of the water-laid sheet shortly after it has been formed and during free drainage, with a solution of a defloccuIant, boards of improved strength are realized.

DESCRIPTION OF THE PREFERRED EMBODIMENTS

As disclosed in Ollinger U.S. application Ser. No. 466,477, filed June 23, 1965, now U.S. Pat. No. 3,371,134, a slurry is initially prepared containing from about 65% to 99% by weight of water and, based on total solids, from 20% to 35% by weight of a clay having the clay characteristics of Mississippi M & D clay and from 65% to 80% by weight of an inorganic wool. This slurry is flocculated by adding alum thereto along and then is further treated with a minor percent of a clay retention aid, namely a polyethylene oxide sold under the trade name designation "Polyox" by Union Carbide Corporation, which acts to further bind the mineral wool and clay. After the slurry has been formed and flocculated it is added to the head-box of a Fourdrinier machine from which point it flows onto the wire forming a water-laid sheet in which the water is present from the extent of from about 45% to 75% by weight of the sheet. In forming the sheet, the water-laid web passes through a free drainage section, between compression rolls and then over a vacuum to give the final desired thickness and to reduce the water content to about 45% to 75% by weight of the sheet. The sheet is then passed through a dryer to remove the remainder of the water after which it is fired for a relatively short period of time, usually about ten minutes, at a temperature somewhere within the range of from about 1,000° F. to about 1,600° F. The product formed is a light-colored incombustable ceramic acoustical product having low density and good dimensional stability.

If, in addition to the above-mentioned ingredients, between about 0.50% and 9.0% by weight the total solids of sodium bicarbonate is added to the slurry prior to board formation, a board having improved strength is realized. This feature is disclosed in U.S. application Ser. No. 149,035 (Pat. No. 3,136,683) and, the disclosures of both U.S. application Ser. No. 466,477 and U.S. application Ser. No. 149,035 are incorporated herein by reference. However, this addition, prior to formation of the board has been found to interfere with the proper flocculation of the sheet and improper flocculation results in poor clay retention on board formation with attendant loss of board strength. In addition, the presence of sodium bicarbonate in the drainage water interferes with proper flocculation if the drainage water is re-used in slurry formation.

I have discovered that if a solution of sodium carbonate, sodium bicarbonate, or sodium hydroxide is showered onto the board after it has been formed on the wire but prior to the point at which most of the water has been removed, clay retention is maximized and boards having improved strengths are achieved. By adding the sodium bicarbonate, sodium carbonate, or sodium hydroxide solution by a water shower to the surface of the sheet as the stock flows out of the head-box onto the wire, the sodium carbonate, sodium bicarbonate, or sodium hydroxide becomes distributed throughout the sheet by the water which is being removed in the free drainage section and the vacuum phase which follow in board formation. The solution causes defIocculation of the formed sheet and the strength of the board thus formed and thereafter fired is measurably improved. When the deflocculating solution is added after the water-laid sheet has been formed, even though deflocculation occurs, the clay retention is not changed appreciably since, after formation, the smaller clay particles are retained by the closely-knit fibers in the water-laid web.

In practicing the invention it is preferable to go through a two-stage flocculation. Thus the water slurry of mineral wool and clay is initially flocculated by adding 0.1% to 0.8% by weight, based on the total solids, of a papermakers alum (a hydrated aluminum sulfate) to the slurry and mixing. At this point other desired additives such as minor amounts of starch may be added.

The flocculated slurry is then further flocculated just prior to board formation by adding and mixing a secondary flocculant such as polyethylene oxide in the weight range of 0.01% to 0.2%, based on the weight of total solids in the slurry. This further flocculated slurry is then flowed onto the forming wire of the board forming machine to form the water-laid web of mineral fiber and clay.

As the primary flocculants, in place of papermakers alum, $Fe_2(SO_4)_3$, $Ca(OH)_2$ or $CaCl_2$ may be used.

Generally, any non-ionic or anionic polymeric flocculating agent may be used as the secondary flocculant. Examples of such agents are Polyox (Union Carbide Corporation), a non-ionic polyethylene oxide, Accurac 24 (American Cyanamid), an anionic polyacrylamide and Polyial 295 (Stein Halland Company), an anionic polyacrylamide.

During the free-drainage stage of the board formation and while water saturates the water-laid web, the face of the water-laid web is showered with a water solution of a deflocculant. The deflocculant used is selected from sodium carbonate, sodium hydroxide and sodium bicarbonate. The concentration of the solution of deflocculant used is limited only by the solubility of the deflocculant and by the dilution necessary to give good distribution of the shower across the sheet. The rate of addition is adjusted to give more than 1% by weight of flocculant, based on total solids in sheet. Optimum addition rates for NaOH and $Na_2CO_3$ are about 2.5% by weight solids and for $NaHCO_3$ about 5.0% by weight solids and usually no additional benefits are achieved at greater than 7%.

The following illustrates the invention.

14" x 14" x 5/8" handsheets were prepared using the TAPPI Standard T1001 sheet mold. The following ingredients were mixed for 10 minutes:

|  | Weight, grams | Percent by weight of total solids |
|---|---|---|
| Water | 25,450 |  |
| Mississippi M & D clay | 303 | 40 |
| Tapioca starch | 31 | 4 |
| Papermakers alum | 3.8 | .5 |
| Mineral wool | 433 | 55.5 |

After 9½ minutes mixing 123 grams of 0.25% Polyox solution was added to further flocculate the mix. The flocculated slurry was then added to the sheet mold and a sheet was formed by draining the water through the screen. When a deflocculating agent such as $Na_2CO_3$ was used, it was showered as a 1% to 4% solution onto the draining sheet in the mold while there was about ½" water remaining above the sheet surface. The wet sheets were pressed to 9/16" thickness and dried at 220° F. The sheets were cut in half, and half of the sheets were used for unfired physical property tests. The remainder were fired for six minutes in a kiln at 1,400° F.

The following treatments were investigated:

TABLE I

| Sheet No. | Treatment | *Estimated retention of $Na_2CO_3$ or NaOH, gms. |
|---|---|---|
| 1 | Control—no shower |  |
| 2 | 23 gms. $Na_2CO_3$, 4% solution | 12 |
| 3 | 23 gms. $Na_2CO_3$, 1% solution | 3 |
| 4 | 46 gms. $Na_2CO_3$, 1% solution | 10 |
| 5 | 15 gms. NaOH, 4% solution |  |

*The amount of the deflocculant retained is difficult to exactly determine. These values were obtained using final dry sheet weights and assuming the same percent retention of other ingredients in all sheets. This is not true since the carbonate partially deflocculates the mix and could cause a slight loss of other materials such as clay. The retention values shown are therefore minimum. Actual retention should be somewhat higher.

The following physical properties were measured:

TABLE II

| Sheet No. | Dry properties | | | Fired properties | | |
|---|---|---|---|---|---|---|
|  | Density | MOR | Adjusted MOR | Density | MOR | Adjusted MOR |
| 1 | 2.00 | 417 | 460 | 1.95 | 212 | 223 |
| 2 | 2.00 | 406 | 448 | 1.90 | 216 | 239 |
| 3 | 2.06 | 367 | 382 | 1.93 | 272 | 292 |
| 4 | 2.04 | 351 | 373 | 1.91 | 220 | 242 |
| 5 | 2.06 | 456 | 475 | 1.97 | 230 | 237 |

A Fourdrinier run was made using the following formulation:

Percent by weight of total solids
Mineral wool _____ 57.5
Mississippi M & D clay _____ 40.0
Tapioca starch _____ 2.5
Lime _____ 0.4
Polyox _____ 0.05

Enough water was used to make the final consistency 4% solids.

The 29" wide machine was run a speed of 4.5 ft./min. Polyox was added to the stock after the fan pump, immediately before the machine. After about four feet of free drainage and while there was still free water on the surface of the forming sheet, a 2.6% $Na_2CO_3$ solution was showered on the sheet across the width of the machine. The sheet was then tamped to help break up the Polyox floc, passed over vacuum boxes and pressed to a wet sheet thickness of 0.690" and 66% moisture content. The sheet was then dried and fired at 1,400° F. for six minutes. The first portion of the run was made without the $Na_2CO_3$ shower and the last portion with the shower.

The following properties were obtained:

TABLE III

| | Dry properties | | | Fired properties | | |
|---|---|---|---|---|---|---|
| | Density | MOR | Adjusted MOR | Density | MOR | Adjusted MOR |
| Without shower: | | | | | | |
| Machine direction | 2.03 | 193 | 209 | 2.02 | 151 | 148 |
| Across direction | 2.12 | 274 | 269 | 1.93 | 203 | 219 |
| With $Na_2CO_3$ shower (1.35% $Na_2CO_3$ addition): | | | | | | |
| Machine direction | 1.91 | 178 | 216 | 1.86 | 189 | 218 |
| Across direction | 2.00 | 265 | 293 | 1.93 | 226 | 242 |

Two additional runs were made using the same formulation:

TABLE IV

|  | Dry properties | | | Fired properties | | |
| --- | --- | --- | --- | --- | --- | --- |
|  | Density | MOR | Adjusted MOR | Density | MOR | Adjusted MOR |
| No $Na_2CO_3$ shower: | | | | | | |
| Machine direction | 2.16 | 189 | 179 | 1.95 | 144 | 152 |
| Across direction | 2.09 | 200 | 203 | 2.06 | 180 | 170 |
| $Na_2CO_3$ shower (2.0% $Na_2CO_3$ addition): | | | | | | |
| Machine direction | 1.94 | 125 | 174 | 1.98 | 236 | 240 |
| Across direction | 2.03 | 170 | 181 | 2.04 | 265 | 255 |

Another Fourdrinier run was made using alum, $Al_2(SO_4)_3 \cdot 14H_2O$ as the primary flocculant instead of line (0.4% alum, direct replacement for 0.4% line).

TABLE V

|  | Dry properties | | | Fired properties | | |
| --- | --- | --- | --- | --- | --- | --- |
|  | Density | MOR | Adjusted MOR | Density | MOR | Adjusted MOR |
| $Na_2CO_3$ shower (2.6% $Na_2CO_3$ addition): | | | | | | |
| Machine direction | 1.94 | 125 | 147 | 1.93 | 200 | 214 |
| Across direction | 2.03 | 170 | 181 | 1.95 | 245 | 256 |

Units of Tables I-V:
Density=Lb./board ft.
Modulus of Rupture (MOR)=Lb./sq. in. (ASTM D1037-64)
Adjusted MOR, dry=MOR adjusted to 2.1 lb./board ft.
Adjusted MOR, fired=MOR adjusted to 2.1 lb./board ft.

In board information on Fourdrinier equipment it is a standard practice to reuse drainage water in the slurry formation portion of the operation. Because of the presence of deflocculant in such drainage water, the use thereof results in improper flocculation being achieved in the slurry used for sheet formation. This is evidenced, in production, by a falling off in board strength in boards made from production stock after the initial production and after drainage water containing deflocculant is reused in slurry formation. This disadvantage can be overcome by acid neutralization of the drainage water prior to reuse. It is desirable to use a mineral acid, hydrochloric, sulfuric or nitric, and to neutralize to an adjusted pH of between about 6.8 and 7.2.

I claim:
1. In a process for forming a mineral fiber-clay ceramic board product wherein mineral fiber and clay are slurried with water, formed into a water-laid sheet on the wire of a board forming machine and the sheet drained, dried and fired, the improvement comprising the steps of:

flocculating the clay and mineral fiber slurry by adding an mixing, based on the weight of solids in said slurry, from 0.1% to 0.8% by weight of a flocculant selected from the group consisting of a hydrated aluminum sulfate, $Ca(OH)_2$, $CaCl_2$ and $Fe_2(SO_4)_3$, forming a water-laid sheet from said flocculated slurry and, while said sheet is being initially subjected to dewatering on said wire, showering a solution of a deflocculant onto the surface of said draining sheet at a rate and concentration sufficient to provide at least one percent by weight of deflocculant, based on the total solids in said sheet, distributed throughout said sheet, said deflocculant being selected from the group consisting of $Na_2CO_3$, $NaHCO_3$ and $NaOH$.

2. The method as defined in claim 1 in which from 0.01% to 0.2% by weight, based on the weight of total solids, of a secondary flocculant selected from the group consisting of a non-ionic and an anionic polymeric flocculating agent is added to and mixed with said slurry just prior to sheet formation.

3. The method as defined in claim 2 in which the primary flocculant is a hydrated aluminum sulfate, the secondary flocculant a polyethylene oxide and the deflocculant $Na_2CO_3$.

4. The method as defined in claim 1 in which the drainage water is reused in forming additional slurry and in which the drainage water so reused is treated with a mineral acid to adjust the pH to 6.8 to 7.2.

References Cited

UNITED STATES PATENTS 3,042,577 7/1962 Thomas _____ 162—115
3,136,683 3/1968 Denlinger _____ 162—152

FRANK W. MIGA, Primary Examiner

F. FREI, Assistant Examiner

U.S. Cl. X.R.

106—72; 162—115, 169, 181, 182; 264—56, 63